(12) United States Patent
Cantu et al.

(10) Patent No.: US 11,487,267 B2
(45) Date of Patent: Nov. 1, 2022

(54) SIMPLIFYING COMMUNICATION BETWEEN A CLIENT APPLICATION AND A SINGLE-BOARD DATA PROCESSING SYSTEM

(71) Applicant: Idera, Inc., Houston, TX (US)

(72) Inventors: Marco Cantu, Placenza (IT); Takeshi Arisawa, Santa Cruz, CA (US)

(73) Assignee: Idera, Inc., Houston, TX (US)

( * ) Notice: Subject to any disclaimer, the term of this patent is extended or adjusted under 35 U.S.C. 154(b) by 265 days.

(21) Appl. No.: 16/751,571

(22) Filed: Jan. 24, 2020

(65) Prior Publication Data
US 2020/0241496 A1 Jul. 30, 2020

Related U.S. Application Data

(60) Provisional application No. 62/797,943, filed on Jan. 28, 2019.

(51) Int. Cl.
| | | |
|---|---|---|
| *G06F 9/44* | (2018.01) | |
| *G06F 9/455* | (2018.01) | |
| *G06F 9/445* | (2018.01) | |
| *G05B 19/05* | (2006.01) | |
| *H04W 4/80* | (2018.01) | |

(Continued)

(52) U.S. Cl.
CPC ......... *G05B 19/058* (2013.01); *G05B 19/054* (2013.01); *H04L 67/56* (2022.05); *H04W 4/80* (2018.02); *H04W 80/04* (2013.01)

(58) Field of Classification Search
CPC ..... G05B 19/054; G05B 19/058; H04W 4/80; H04W 4/44; H04W 4/70; H04W 80/04; H04W 88/04; H04W 12/06; H04W 12/08; H04L 63/083; H04L 67/56; G01C 21/20;
(Continued)

(56) References Cited

U.S. PATENT DOCUMENTS 9,801,120 B2 * 10/2017 Ko ........................ H04W 48/10
10,257,873 B2 * 4/2019 Jung ....................... H04L 67/14
(Continued)

OTHER PUBLICATIONS

Sun et al., Closed-Loop Optimal Control of Tethered Robot During Nonplanar Orbital Transfer, 6 pages (Year: 2018).*
(Continued)

*Primary Examiner* — Thuy Dao
(74) *Attorney, Agent, or Firm* — Kent B. Chambers; Terrile, Cannatti & Chambers, LLP

(57) ABSTRACT

A communication simplifier system and method simplify communication between a client application and a single-board data processing system using a tethering architecture. In at least one embodiment, the communication simplifier system and method allows a software developer to build a communication tethering application for the single-board data processing system, define a communication connection strategy, and add a client communication tethering application to a remote computer system, such as a mobile or desktop client computer system, to handle communication with the single-board data processing system. The client computer system also offloads processing from the single-board data processing system by including a processing logic application to implement additional logic to process data received by the single-board data processing system.

21 Claims, 3 Drawing Sheets

(51) Int. Cl.
*H04W 80/04* (2009.01)
*H04L 67/56* (2022.01)

(58) Field of Classification Search
CPC ... G05D 1/0278; G05D 1/0033; G05D 1/0274
See application file for complete search history.

(56) References Cited

U.S. PATENT DOCUMENTS

| 2012/0257585 | A1* | 10/2012 | Sydor | H04W 72/082 |
| | | | | 370/329 |
| 2015/0351004 | A1* | 12/2015 | Ko | H04W 4/80 |
| | | | | 455/411 |
| 2016/0285708 | A1 | 9/2016 | Papadopoulos et al. | |
| 2016/0357525 | A1 | 12/2016 | Wee et al. | |

OTHER PUBLICATIONS

Canadian Intellectual Property Office, Canadian Search Report dated Jul. 13, 2021, filed in Canadian Application No. 3,069,920, Toronto, Ontario, Canada, pp. 1-3.

United Kingdom International Patent Office, South Wales, Search Report under Section 17(5) dated Aug. 4, 2020, filed in United Kingdom International Patent Office Application No. GB2001176.3, pp. 1-4.

* cited by examiner

SIMPLIFYING COMMUNICATION BETWEEN A CLIENT APPLICATION AND A SINGLE-BOARD DATA PROCESSING SYSTEM

BACKGROUND OF THE INVENTION

Field of the Invention

The present invention relates in general to the field of electronic systems and methods, and more specifically to a system and method for simplifying communication between a client application and a single-board data processing system.

Description of the Related Art

Single-board data processing systems, such as single-board computers and single-board microcontrollers, have become widely utilized for a variety of purposes. An exemplary single-board computer is a Raspberry Pi developed by the Raspberry Pi Foundation of the United Kingdom, and an example of a single-board microcontroller is an Arduino microcontroller. Uses Single-board data processing systems are programmable and able to receive inputs from a variety of sources and provided programmable outputs. Thus, single-board data processing systems present a very flexible platform for simple projects through complex scientific experiments. For example, single-board data processing systems can read inputs from a virtually limitless range of sensors or other data sources, such as hygrometers for sensing humidity and water vapor, light sensors, pressure sensors, temperature sensors and providing a programmable output such as controlling an information on a display, publishing information on the world-wide web, controlling water flow, controlling motors, etc.

The popularity of single-board data processing systems derives in part from their physical accessibility due to, for example, relatively low cost and functional accessibility due to, for example, widely available programming tools. However, to maintain accessibility, the onboard features and functionality of single-board data processing systems is limited relative to multi-board data processing systems such as laptop and desktop computers.

FIG. 1 depicts a single-board data processing system 100. The single-board data processing system 100 includes a processor 102, such as an ARM Cortex processor by ARM Holdings, that is coupled to a memory 104. The memory 104 stores one or programs that are executable by the processor 102 to allow the single-board data processing system 100 to perform programmable functions. The single-board data processing system 100 may or may not include an operating system depending on the type of system. The processor 102 executes the custom application 105 to perform programmable functions. The programmable functions include specific data processing, input/output data control through input/output circuitry 106, and communication access to external devices such as sensor 108, a control device 110, and a database 112.

In a hygrometer example, the processor 102 executes the custom application 105 to receive data from the sensor 108 that indicates the humidity at the location of the sensor 108, such as in a flower bed. The custom application 105 includes processing logic to determine whether the humidity is adequate for a particular flower and relies on information that is either hardcoded into the memory 104 or obtained via the input/output circuit 106 from remote database 112. To access the database 112, the custom application 105 includes programming to communicate with the database 112 in accordance with a particular communication protocol and to correctly process the information received from the database 112. The custom application 105 also includes executable programming to cause the input/output circuitry 106 to provide a control signal to the control device 110 to adjust the humidity if the custom application 105 indicates that the humidity is not within a preferred range.

A drawback of the single-board data processing system 100 involves the custom application 105. The custom application 105 is custom designed to provide the programmable functions of the single-board data processing system 100 including all data processing functions including communication functions. Development of custom application 105 can be inefficient and difficult.

SUMMARY

In one embodiment, a method to simplify communication between a computing device (CD) and a single-board data processing system (SBDPS) includes establishing communication between a SBDPS tethering application executing on the SBDPS and a CD tethering application executing on the CD. The method also includes receiving sensor data at the SBDPS from a sensor coupled to the SBDPS and instructing the SBDPS tethering application to cause the SBDPS to send the sensor data to the CD. The method further includes receiving operable data at the SBDPS from the CD, wherein the operable data has been processed via the CD tethering application as a proxy processor for the SBDPS to interpret and process the sensor data to generate operable data that is responsive to the sensor data and sending the operable data to a control device to control one or more operations of the control device.

In another embodiment, an apparatus includes a single-board data processing system (SBDPS) that includes input/output circuitry, a processor coupled to the input/output circuitry; and a memory, coupled to the processor, that includes an SBDPS tethering application stored in the memory. Execution by the processor of the SBDPS tethering application causes the SBDPS to perform establishing communication between a SBDPS tethering application executing on the SBDPS and a computing device (CD) tethering application executing on the CD and receiving sensor data at the SBDPS from a sensor coupled to the SBDPS. Execution by the processor of the SBDPS tethering application also causes the SBDPS to perform instructing the SBDPS tethering application to cause the SBDPS to send the sensor data to the CD. Execution by the processor of the SBDPS tethering application further causes the SBDPS to perform receiving operable data at the SBDPS from the CD, wherein the operable data has been processed via the CD tethering application as a proxy processor for the SBDPS to interpret and process the sensor data to generate operable data that is responsive to the sensor data and sending the operable data to a control device to control one or more operations of the control device.

In a further embodiment, a computing device includes input/output circuitry, a processor coupled to the input/output circuitry, and a memory, coupled to the processor, that includes a CD tethering application stored in the memory. Execution by the processor of the CD tethering application causes the CD to perform communicating with a single-board data processing system (SBDPS) tethering application executing on the SBDPS and the CD tethering application and interfacing with the SBDPS to read status data and receive sensor data from a sensor coupled to the SBDPS. Execution by the processor of the CD tethering application causes the CD to further perform receiving the sensor data from the SBDPS. The memory further stores a processing logic application as a processor proxy for the SBDPS. Execution by the processor of the processing logic application causes the CD to perform interpreting and processing the sensor data, generating operable data that is responsive to the sensor data, and providing the operable data, via the input/output circuitry, to the SBDPS to control one or more operations of a control device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a communication simplifier system and method simplify communication between a client application and a single-board data processing system using a tethering architecture. In at least one embodiment, the communication simplifier system and method allows software developer to build a communication tethering application for the single-board data processing system, define a communication connection strategy, and add a client communication tethering application to a remote computer system, such as a mobile or desktop client computer system, to handle communication with the single-board data processing system. The client computer system also offloads processing from the single-board data processing system by including a processing logic application to implement additional logic to process data received by the single-board data processing system.

Figure 1:
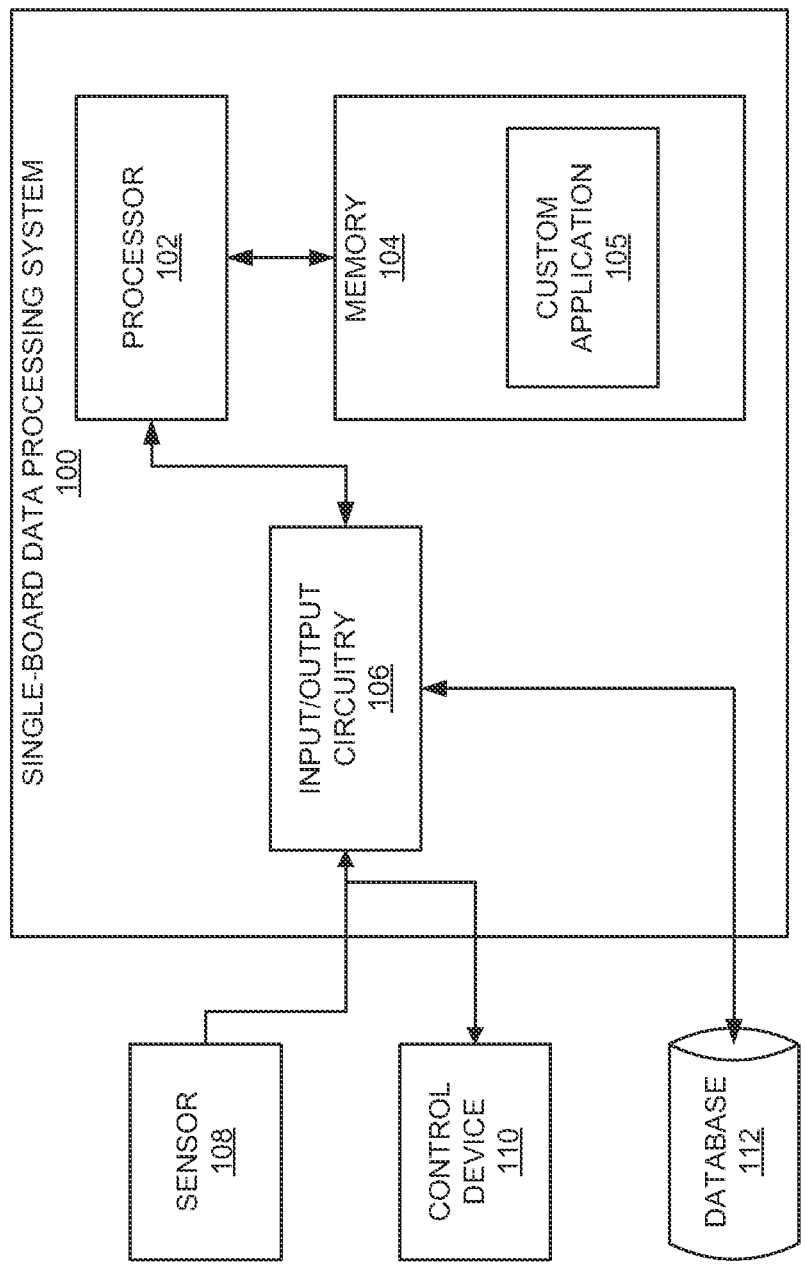
FIG. 1 (labeled prior art) depicts a single-board data processing system.
Figure 2:
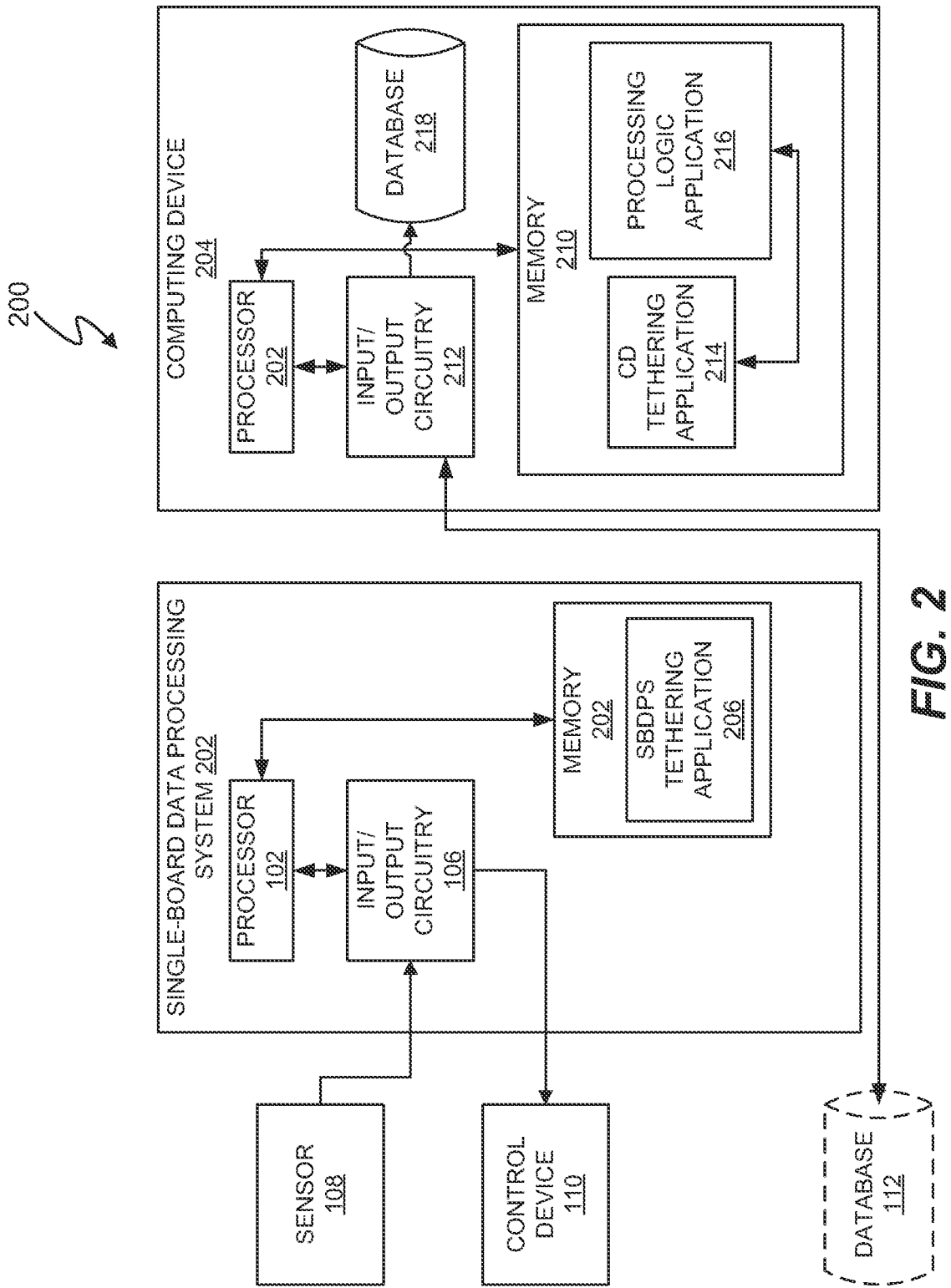
FIG. 2 depicts a distributed single-board data processing system-client computing device system.

FIG. 2 depicts a distributed single-board data processing system-client computing device system 200, which includes single-board data processing system 202 and client computing device 204. The single-board data processing system 202 is identical to single-board data processing system 100 except that memory 202 includes a communication tethering program. In at least one embodiment, the tethering program is a tethering application 206, and, in at least one embodiment, the tethering program is a tethering library (not shown) that is implemented by a standard application (not shown) stored in memory 202. Executing the tethering application 206 by the processor 102 transmits information via the input/output circuitry 106 to the computing device 204, via one or more communication layers. The information advertises the presence of the single-board data processing system 202 and associated communication parameters. For example, the communication parameters expose key communication features of the single-board data processing system 202 such as communication signal status and an ability to change the configuration of the single-board data processing system 202 such as change communication configuration. The particular communication process and protocol used by the single-board data processing system 202 is a matter of design choice, such as a transmission control protocol and the internet protocol (TCP/IP)-based infrastructure (over a local area network or WiFi) or Bluetooth-based communication.

The computing device 204 includes a processor 202 that executes programs stored in memory 210. The input/output circuitry 212 receives communication transmissions from the single-board data processing system 202 SBDPS tethering application 206, and a computing device (CD) tethering application 214 in memory 210 causes the processor 202 to recognize and establish a communication link with the single-board data processing system 202 via the CD tethering application 214.

In at least one embodiment, the tethering application 214 discovers available transmitting and available single-board data processing systems and initiates communication. The tethering application 214 interfaces with the single-board data processing systems, reads status, receives signals, and accesses or hosts processing logic application 216, thereby acting as a processor proxy for the single-board data processing systems. This distribution and centralized processing can greatly reduce the need of writing a processing logic application on the single-board data processing systems, provides much easier development of a desktop or mobile app with a user interface (UI) for interfacing with the single-board data processing systems. Even in case of a custom single-board data processing systems application, the tethering application 206 is able to simplify the development of the communication layer, and allow building the computing device 204 with a desired user interface. Developers can use RAD Studio to develop the applications. RAD Studio is available from EMBARCADERO an Idera company with offices in Austin, Tex.

Rather than processing the data received from sensor 108, the single-board data processing system (SBDPS) tethering application 206 causes single-board data processing system 202 to transmit the sensor 108 data. In at least one embodiment, the CD tethering application 214 makes the sensor 108 data available to the processing logic application 216. In at least one embodiment, the processing logic application 216 replaces sensor 108 data processing logic of custom application 105. The computing device 204 has more computing resources, ready access to exemplary onboard database 218 and/or to remote database 112. The processing logic application 216 retrieves any data used to process the sensor 108 data and generates responsive results for single-board data processing system 202, such as control data for control device 110. Executing the CD tethering application 214 causes the input/output circuitry 212 to transmit the responsive results to the single-board data processing system 202, and executing the SBDPS tethering application 206 causes the input/output circuitry 106 to send the control data to control device 110.

In at least one embodiment, the CD tethering application 214 communicates with multiple SBDPS tethering applications like application 206 so that the computing device 204 becomes a central processing source for multiple single-board data processing systems. In at least one embodiment, one or more CD tethering application(s) 214 can host multiple components for accessing several single-board data processing systems with different hardware configurations and create a single UI for multiple single-board data processing system 202 at the same time. In at least one embodiment, the CD tethering application 214 can also provide general services like database access to the single-board data processing system 202, again acting as a proxy to the tethered single-board data processing system 202.

Figure 3:
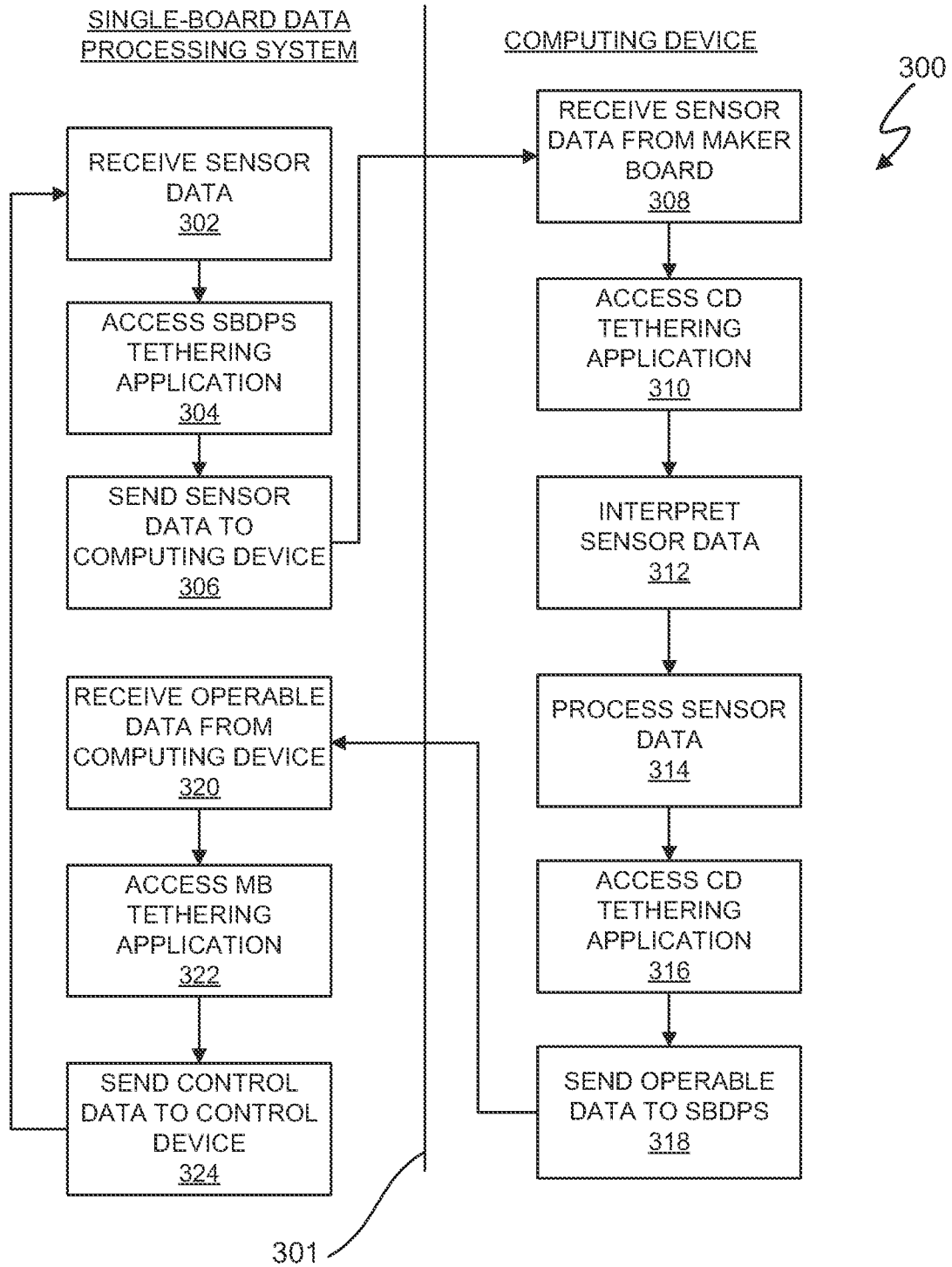
FIG. 3 depicts an exemplary communication and processing distribution process between single-board data processing system and a computing device.

FIG. 3 depicts an exemplary communication and processing distribution process 300 between single-board data processing system 202 and computing device 204 via communication interface 301, such as the Internet or other network or communication link. Referring to FIGS. 2 and 3, the communication and processing distribution process 300 utilizes the hardware and application features of single-board data processing system 202 and computing device 204 as previously discussed. After establishing communication between the single-board data processing system 202 and computing device 204 via the SBDPS tethering application 206 and CD tethering application 214 as previously discussed, in operation 302, single-board data processing system 202 receives sensor data from sensor 108. In operation 304, processor 102 accesses the SBDPS tethering application 206, and the SBDPS tethering application 206 causes single-board data processing system 202 to send the sensor 108 data to the computing device 308 for centralized, remote processing. In operation 308, the computing device 204 receives the sensor 108 data and accesses the CD tethering application 214 in operation 310. The CD tethering application 214 interprets the sensor 108 data in operation 312, and processing logic application 216 processes the sensor 108 data in operation 314 to generate responsive, operable data. Operation 316 accesses the CD tethering application 214 to send the operable data to single-board data processing system 202. In operation 320, the input/output circuitry 106 receives the operable data from the computing device 24, and SBDPS tethering application 206 causes the input/output circuitry 106 to send the operable data, which in this embodiment is control data, to control device 110.

The exemplary communication and processing distribution process 300 embodiment refers to sensor data and processing sensor data. However, the process equally applies to processing any data from single-board data processing system 202.

Thus, a communication simplifier system and method simplify communication between a client application and a single-board data processing system using a tethering architecture. In at least one embodiment, the communication simplifier system and method allows a software developer to build a communication tethering application for the single-board data processing system, define a communication connection strategy, and add a client communication tethering application to a remote computer system, such as a mobile or desktop client computer system, to handle communication with the single-board data processing system. The client computer system also offloads processing from the single-board data processing system by including a processing logic application to implement additional logic to process data received by the single-board data processing system. This distribution and centralized processing can greatly reduce the need of writing a processing logic applications on the single-board data processing systems, provides much easier development of a desktop or mobile app with a user interface (UI) for interfacing with the single-board data processing systems.

Accordingly, in at least one embodiment, a communication simplifier system and method simplifies the development of communication between a client application and the software running on a single-board data processing system board, such as Arduino, Raspberry Pi, or the like, using a tethering architecture. A user of the communication simplifier system and method technology can add a component into the RAD Studio application. In at least one embodiment, the RAD Studio application has the capability of starting a discovery phase over the local network or Bluetooth devices to connect to the application running on the board, once the component is active. In at least one embodiment, a single client application is able to control multiple single-board data processing system boards at the same time, in a supervisor role.

In at least one embodiment, a standard application running on the single-board data processing system board exposes access to key feature information, such as signal status, ability to change the configuration, allowing the client application to access any of the information. In at least one embodiment, in a case of utilizing a custom application for the board, a developer utilizes a ready-to-use tethering library for the board and compiles this library into a custom application.

In at least one embodiment, the single-board data processing system board runs a standard application including a local tethering library with the ability to access hardware and expose information via multiple communication layers. The application can also advertise the presence and parameters of the board. In at least one embodiment, communication between the board and other devices takes place using either a TCP/IP-based infrastructure (over a local area network or WiFi network) or using Bluetooth-based communication. In at least one embodiment, the developer of a custom application for the single-board data processing system board can use the same tethering library and compile into the single-board data processing system board as part of the application on the single-board data processing system board, which easily enables the tethering support to, for example, a computing device, such as computing device 204.

In at least one embodiment, the RAD Studio application is able to discover the available single-board data processing system boards and initiate the communication. The component is able to interface with the board, read status, receive signals, and host the required application logic, acting as a processor proxy for the board. This can greatly reduce the need of writing an application on the specific single-board data processing system board, providing much easier development of a desktop or mobile app with a user interface (UI) for interfacing with the board. Even in case of a custom single-board data processing system board application, the library is able to simplify the development of the communication layer and allow building the client application with a desired UI as discussed above.

In at least one embodiment, the same applications can host multiple components for accessing several boards with different hardware configurations, and create a single UI for multiple single-board data processing system boards at the same time. In at least one embodiment, the application more easily offers general services like database access, again acting as a proxy to the tethered single-board data processing system board.

Although embodiments have been described in detail, it should be understood that various changes, substitutions, and alterations can be made hereto without departing from the spirit and scope of the invention as defined by the appended claims.

What is claimed is:

1. A method to simplify communication between a computing device (CD) and a single-board data processing system (SBDPS), the method comprising:
    establishing communication between a SBDPS tethering application executing on the SBDPS and a CD tethering application executing on the CD, wherein establishing communication comprises:

executing the tethering application by a processor of the SBDPS to transmit information via input/output circuitry of the SBDPS to the CD, wherein the information advertises a presence of the SBDPS and associated communication parameters, wherein the associated communication parameters expose communication features of the SBDPS including a communication signal status and an ability to change a configuration of the SBDPS;

receiving sensor data at the SBDPS from a sensor coupled to the SBDPS;

instructing the SBDPS tethering application to cause the SBDPS to send the sensor data to the CD;

receiving operable data at the SBDPS from the CD, wherein the operable data has been processed via the CD tethering application as a proxy processor for the SBDPS to interpret and process the sensor data to generate operable data that is responsive to the sensor data; and sending the operable data to a control device to control one or more operations of the control device.

2. The method of claim 1 wherein establishing communication between the SBDPS tethering application and the CD tethering application executing on the CD further comprises:

establishing communication using a protocol selected from a group consisting of: a Transmission Control Protocol and the Internet Protocol and a Bluetooth-based communication protocol.

3. The method of claim 1 wherein establishing communication between the SBDPS tethering application and the CD tethering application executing on the CD further comprises:

receiving a communication at the SBDPS that is initiated by the CD tethering application.

4. The method of claim 1 further comprising:

communicating between the SBDPS and the CD tethering application to provide an interface between the CD and the SBDPS so that the CD tethering application reads SBDPS status information, receives signals from the SBDPS, and provides a processing logic application to serve as a processor proxy to generate the operable data for the SBDPS.

5. The method of claim 1 wherein execution by the processor of the CD tethering application causes the CD to perform:

initiating communication that is initiated by the CD tethering application that is received by one or more of the SBDPS's.

6. The method of claim 1 further comprising:

executing by the CD the CD tethering application to communicate with the SBDPS tethering application to perform;

interfacing with the SBDPS to read status data and receive sensor data from the sensor coupled to the SBDPS; and receiving the sensor data from the SBDPS;

executing by the CD a processing logic application as the processor proxy for the SBDPS to perform:

interpreting and processing the sensor data;

generating operable data that is responsive to the sensor data; and providing the operable data, via the input/output circuitry, to the SBDPS.

7. An apparatus comprising:

a single-board data processing system (SBDPS), wherein the SBDPS includes:

input/output circuitry;

a processor coupled to the input/output circuitry; and a memory, coupled to the processor, that includes an SBDPS tethering application stored in the memory, wherein execution by the processor of the SBDPS tethering application causes the SBDPS to perform:

establishing communication between a SBDPS tethering application executing on the SBDPS and a CD tethering application executing on the CD, wherein establishing communication comprises:

executing the tethering application by a processor of the SBDPS to transmit information via input/output circuitry of the SBDPS to the CD, wherein the information advertises a presence of the SBDPS and associated communication parameters, wherein the associated communication parameters expose communication features of the SBDPS including a communication signal status and an ability to change a configuration of the SBDPS;

receiving sensor data at the SBDPS from a sensor coupled to the SBDPS;

instructing the SBDPS tethering application to cause the SBDPS to send the sensor data to the CD;

receiving operable data at the SBDPS from the CD, wherein the operable data has been processed via the CD tethering application as a proxy processor for the SBDPS to interpret and process the sensor data to generate operable data that is responsive to the sensor data; and sending the operable data to a control device to control one or more operations of the control device.

8. The apparatus of claim 7 wherein establishing communication between the SBDPS tethering application and the CD tethering application executing on the CD further comprises:

establishing communication using a protocol selected from a group consisting of: a Transmission Control Protocol and the Internet Protocol and a Bluetooth-based communication protocol.

9. The apparatus of claim 7 wherein establishing communication between the SBDPS tethering application and the CD tethering application executing on the CD further comprises:

receiving a communication at the SBDPS that is initiated by the CD tethering application.

10. The apparatus of claim 9 wherein establishing communication between the SBDPS tethering application and the CD tethering application executing on the CD further comprises:

establishing communication using a protocol selected from a group consisting of: a Transmission Control Protocol and the Internet Protocol and a Bluetooth-based communication protocol.

11. The apparatus of claim 9 wherein establishing communication between the SBDPS tethering application and the CD tethering application executing on the CD further comprises:

receiving a communication at the SBDPS that is initiated by the CD tethering application.

12. The apparatus of claim 7 wherein execution by the processor of the SBDPS tethering application causes the SBDPS to further perform:

communicating between the SBDPS and the CD tethering application to provide an interface between the CD and the SBDPS so that the CD tethering application reads SBDPS status information, receives signals from the SBDPS, and provides a processing logic application to serve as a processor proxy to generate the operable data for the SBDPS.

13. The apparatus of claim 7 further comprises:
the computing device, wherein the computing device includes:
CD input/output circuitry;
a CD processor coupled to the CD input/output circuitry; and
a CD memory, coupled to the CD processor, that includes a CD tethering application stored in the CD memory, wherein execution by the CD processor of the CD tethering application causes the CD to perform:
communicating with the SBDPS tethering application executing on the SBDPS;
interfacing with the SBDPS to read status data and receive sensor data from the sensor coupled to the SBDPS; and
receiving the sensor data from the SBDPS;
wherein the CD memory further stores a processing logic application as the processor proxy for the SBDPS, wherein execution by the CD processor of the processing logic application causes the CD to further perform:
interpreting and processing the sensor data;
generating operable data that is responsive to the sensor data; and
providing the operable data, via the input/output circuitry, to the SBDPS.

14. The apparatus of claim 13 wherein execution by the processor of the tethering application further causes the CD to perform:
making the sensor data available to the processing logic application.

15. The apparatus of claim 13 wherein:
execution by the processor of the CD tethering application further causes the CD to perform:
communicating with multiple SBDPS tethering applications executing on multiple SBDPS's; and
execution by the processor of the processing logic application further causes the CD to perform:
central processing for the multiple SBDPS's.

16. The apparatus of claim 15 wherein the memory hosts multiple components that are executable by the processor to (i) access multiple SBDPS's with different hardware configurations and (ii) create a single user interface for the SBDPS's at the same time.

17. The apparatus of claim 15 wherein the memory further includes code executable by the processor to cause the CD tethering application to provide multiple services including database access to the SBDPS.

18. An apparatus comprising:
a single-board data processing system (SBDPS), wherein the SBDPS includes:
input/output circuitry;
a processor coupled to the input/output circuitry; and
a memory, coupled to the processor, that includes an SBDPS tethering application stored in the memory, wherein execution by the processor of the SBDPS tethering application causes the SBDPS to perform:
establishing communication between a SBDPS tethering application executing on the SBDPS and a computing device (CD) tethering application executing on the CD;
transmitting information via input/output circuitry of the SBDPS to the CD, wherein the information advertises a presence of the SBDPS and associated communication parameters;
receiving sensor data at the SBDPS from a sensor coupled to the SBDPS;
instructing the SBDPS tethering application to cause the SBDPS to send the sensor data to the CD;
receiving operable data at the SBDPS from the CD, wherein the operable data has been processed via the CD tethering application as a proxy processor for the SBDPS to interpret and process the sensor data to generate operable data that is responsive to the sensor data; and
sending the operable data to a control device to control one or more operations of the control device; and
the CD, wherein the computing device includes:
CD input/output circuitry;
a CD processor coupled to the CD input/output circuitry; and
a CD memory, coupled to the CD processor, that includes a CD tethering application stored in the CD memory, wherein execution by the CD processor of the CD tethering application causes the CD to perform:
communicating with the SBDPS tethering application executing on the SBDPS;
interfacing with the SBDPS to read status data and receive sensor data from the sensor coupled to the SBDPS;
receiving the sensor data from the SBDPS; and
communicating with multiple SBDPS tethering applications executing on multiple SBDPS's;
wherein the CD memory further stores a processing logic application as the processor proxy for the SBDPS, wherein execution by the CD processor of the processing logic application causes the CD to further perform:
interpreting and processing the sensor data;
generating operable data that is responsive to the sensor data;
providing the operable data, via the input/output circuitry, to the SBDPS; and
central processing for the multiple SBDPS's.

19. The apparatus of claim 18 wherein execution by the processor of the CD tethering application causes the CD to perform:
receiving from the SBDPS information advertising a presence of the SBDPS and associated communication parameters.

20. The apparatus of claim 19 wherein the associated communication parameters expose communication features of the SBDPS including a communication signal status and an ability to change a configuration of the SBDPS.

21. The apparatus of claim 18 wherein:
wherein communicating with each SBDPS comprises communicating using a protocol selected from a group consisting of: a Transmission Control Protocol and the Internet Protocol and a Bluetooth-based communication protocol.

* * * * *